(12) United States Patent
Chung et al.

(10) Patent No.: US 6,301,352 B1
(45) Date of Patent: Oct. 9, 2001

(54) METHOD AND SYSTEM FOR PROVIDING AN ALTERNATIVE COMMON CHANNEL SIGNALING PATH

(75) Inventors: Peter S Chung, Palatine; Sang B. Lee, Chicago; Thomas B. Gregory, Trout Valley, all of IL (US)

(73) Assignee: 3Com Corporation, Santa Clara, CA (US)

( * ) Notice: Subject to any disclaimer, the term of this patent is extended or adjusted under 35 U.S.C. 154(b) by 0 days.

(21) Appl. No.: 09/173,142

(22) Filed: Oct. 15, 1998

(51) Int. Cl.[7] .............................. H04M 7/00; H04M 3/42; H04L 1/00
(52) U.S. Cl. .................. 379/229; 379/221.03; 379/230; 379/213.01; 370/237; 370/235; 370/384; 709/249
(58) Field of Search .................................. 379/213, 230; 709/249; 370/237, 356, 701

(56) References Cited

U.S. PATENT DOCUMENTS

| | | |
|---|---|---|
| 5,282,244 | 1/1994 | Fuller et al. . |
| 5,423,003 | 6/1995 | Berteau . |
| 5,521,902 | 5/1996 | Ferguson . |
| 5,528,595 | 6/1996 | Walsh et al. . |
| 5,577,105 | 11/1996 | Baum et al. . |
| 5,680,437 | 10/1997 | Segal . |
| 5,737,404 | 4/1998 | Segal . |
| 5,793,771 | 8/1998 | Darland et al. . |
| 5,838,682 | 11/1998 | Lindquist . |
| 5,867,788 | 2/1999 | Joehnsuu . |
| 5,983,282 | * 11/1999 | Yucebay ............................... 709/249 |
| 6,064,653 | * 5/2000 | Farris .................................. 370/237 |
| 6,084,892 | * 7/2000 | Benash et al. ....................... 370/701 |
| 6,084,956 | * 7/2000 | Turner et al. ........................ 379/230 |
| 6,130,880 | 10/2000 | Naudus et al. ...................... 370/235 |
| 6,181,695 | * 12/1998 | Curry et al. ......................... 370/356 |
| 6,233,237 | 5/2001 | Yucebay et al. ..................... 370/384 |

* cited by examiner

Primary Examiner—Harry S. Hong
Assistant Examiner—Thjuan P. Knowlin
(74) Attorney, Agent, or Firm—McDonnell Boehnen Hulbert & Berghoff; Stephen Lesavich

(57) ABSTRACT

A method and system for providing an alternate common channel signaling system path. The alternative signaling path that does not rely on the same hardware or software that is used for a primary signaling path. The alternative signal path allows network devices on a local area network to be signaled when a primary signaling path to the local area network has failed. The alternative signaling paths may provide better fault tolerance for connecting local area networks to other external networks.

20 Claims, 2 Drawing Sheets

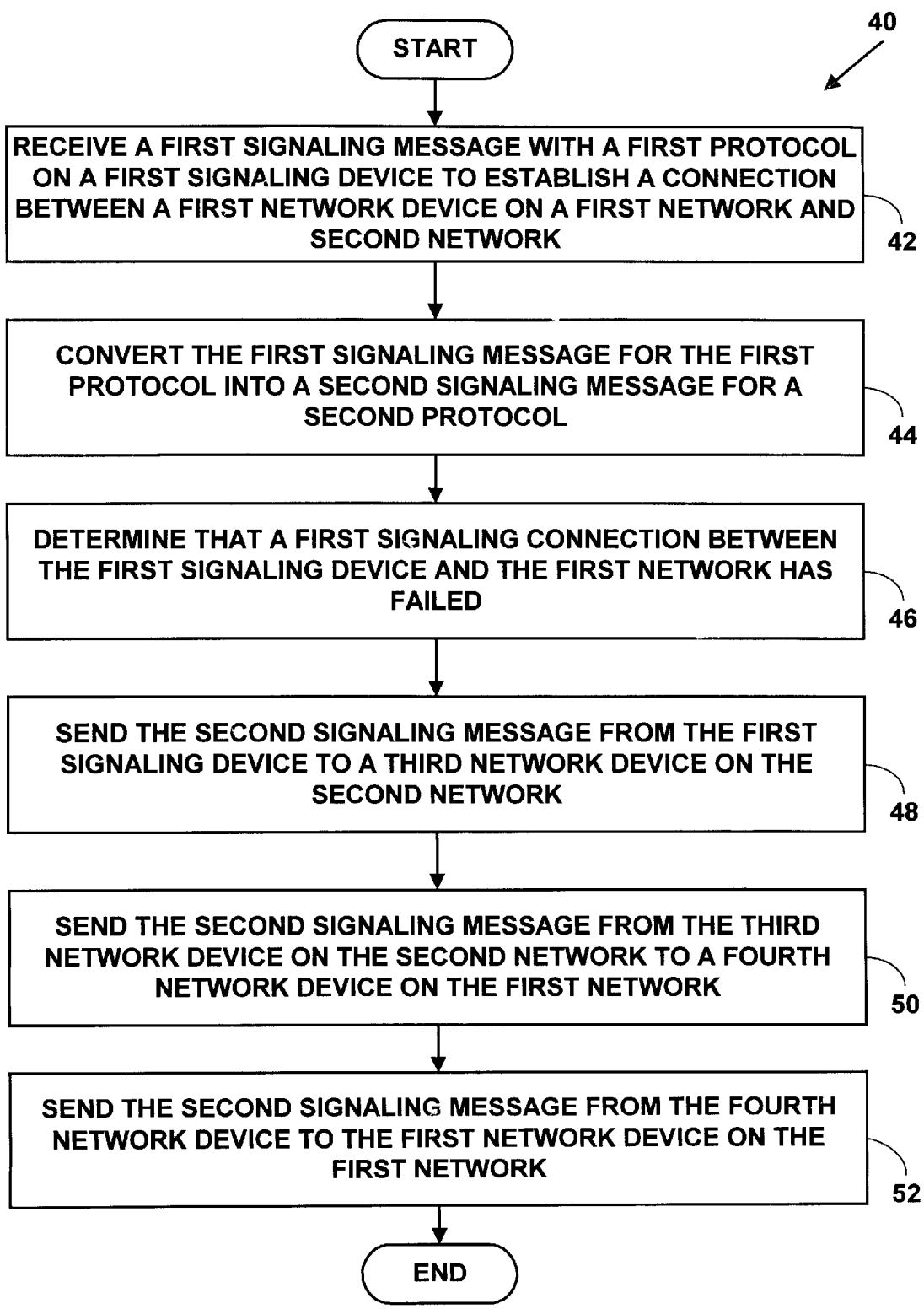

METHOD AND SYSTEM FOR PROVIDING AN ALTERNATIVE COMMON CHANNEL SIGNALING PATH

FIELD OF INVENTION

This invention relates to computer networks. More specifically, it relates to a method and system for providing an alternative common channel signaling pathway via dialed-up access.

BACKGROUND OF THE INVENTION

Common Channel Signaling System Number-7 ("CCS7" or "SS7") is a method of signaling that uses an out-of-band or separate channel signaling for conveying signaling information for a number of telecommunications channels. Common channel signaling is used in the Public Switched Telephone Network ("PSTN"), with Integrated Services Digital Network ("ISDN"), circuit switched networks and data networks. Common channel signaling is also being used for cellular and mobile telephony and network management.

The common channel carrying signaling information is called a signaling link. Signaling information is exchanged between signaling points over a signaling link using signaling data packets. Common channel signaling system number-7 includes a structured protocol partitioned into four levels including from lowest to highest a physical, data link, network and user part level. The physical, data link and network levels transfer signaling messages between signaling points reliably and accurately. They also provide network management functions. The physical, data link and network levels are collectively referred to as the Message Transfer Part ("MTP").

The user part level includes signaling applications to provide desired functionality. The user part level includes a Telephone User Part ("TUP"), ISDN User Part ("ISUP"), Transaction Capability Application Part ("TCAP") and others. The ISDN User Part includes both analog and digital telephony.

A common channel signaling gateway host is often used on Local Area Networks("LAN") to interface with the public switched telephone network. One of the functions of the common channel signaling gateway host is to convert a common channel signaling user part message (e.g., ISDN user part messages) into a local protocol that is known by network devices on the local area network. The local protocol messages are forwarded over a local area network connection to network devices to set up a telecommunications connection.

For example, a common channel signaling host may convert a common channel signaling ISDN user part message into a local protocol message and send the local protocol message over a local area connection to a modem device to set up a telephone call or a data connection. The modem device will respond to the common channel signaling host in the local protocol. The common channel signaling host will then convert the local protocol response back to the common channel signaling protocol and send the response to the public switched telephone network to complete set up of the telephone call or data connection.

Using a common channel signaling gateway on a local area network is subject to several problems. If the local area connection between the common channel signaling gateway and the network devices (e.g., modem devices) fails, communications with the public switched telephone network may be lost unless there is a backup signaling path.

One solution is to provide a backup signaling path using an alternative connection to the local area network from the common channel signaling gateway. However, a hardware or software problem may exist that will also affect the alternative connection to the local area network. For example, if one or two ports on an Ethernet card are used to connect a local area network to a common channel signaling host, and the connection fails, an attempt may be made to use the second port on the Ethernet card as an alternative connection. However, the hardware or software on the Ethernet card may be defective and the alternative signaling connection may be lost. Another Ethernet card may also be used for the alternative connection. However, the Ethernet cards may have a common hardware or software problem so the alternative signaling connection may be lost again.

Thus, it is desirable to provide an alternative connection between a local area network and a common channel signaling gateway host. The alternative connection should not use the same network device to connect the local area network and the common channel signaling gateway host as is used for the primary connection to prevent a common hardware or software problem from affecting both the primary and alternative connection.

SUMMARY OF THE INVENTION

In accordance with preferred embodiments of the present invention, some of the problems associated with providing an alternative signaling path are overcome. A method and system for providing an alternative signaling path is provided. One aspect of the present invention includes a method for providing an alternate signaling connection. The method includes receiving a first signaling message in a first protocol on a first signaling device on a first network from a second network to create a connection between a first network device on the first network and the second network. The first signaling message is converted into a second signaling message in a second protocol on the first signaling device. The first signaling device determines that a signaling first connection between the first signaling device and the first network has failed. The second signaling message is sent from a second network device associated with the first signaling device to a third network device on the second network over a second connection. The second signaling message is sent from the third network device on the second network to a fourth network device on the first network over a third connection. The second signaling message is sent from the fourth network device to the first network device on the first network over a fourth connection thereby providing an alternate signaling connection to the first network device on the first network from the first signaling device.

For example, in one exemplary embodiment of the present invention, a common channel signaling gateway receives a common channel signaling message from the public switched telephone network for a first network device (e.g., a modem) on a local area network. The common channel signaling gateway converts the common channel signaling message into a second signaling message in a second protocol. The common channel signaling gateway determines that a signaling connection to the local area network has failed and uses a second network device (e.g., a modem) to contact a public switched telephone network. The public switched telephone network sends the second signaling message to a network access server associated with the local area network. The network access server receives the second signaling message and sends it to the first network device using an internal connection thereby providing an alternate signaling connection. However, the present invention is not limited to the network devices described in this exemplary embodiment and other embodiments with other network devices may also be used.

Preferred embodiments of the present invention provide an alternative signaling path that does not rely on the same hardware or software that is used for a primary signaling path. The alternative signal path allows network devices on a local area network to be signaled when a primary signaling path to the local area network has failed. The alternative signaling path may provide better fault tolerance for connecting local area networks to other external networks.

The foregoing and other features and advantages of a preferred embodiment of the present invention will be more readily apparent from the following detailed description, which proceeds with references to the accompanying drawings.

BRIEF DESCRIPTION OF THE DRAWINGS

Preferred embodiments of the present inventions are described with reference to the following drawings, wherein:

FIG. 2 is a flow diagram illustrating a method for providing an alternative signaling path.

DETAILED DESCRIPTION OF PREFERRED EMBODIMENTS

Exemplary Network System

Figure 1:
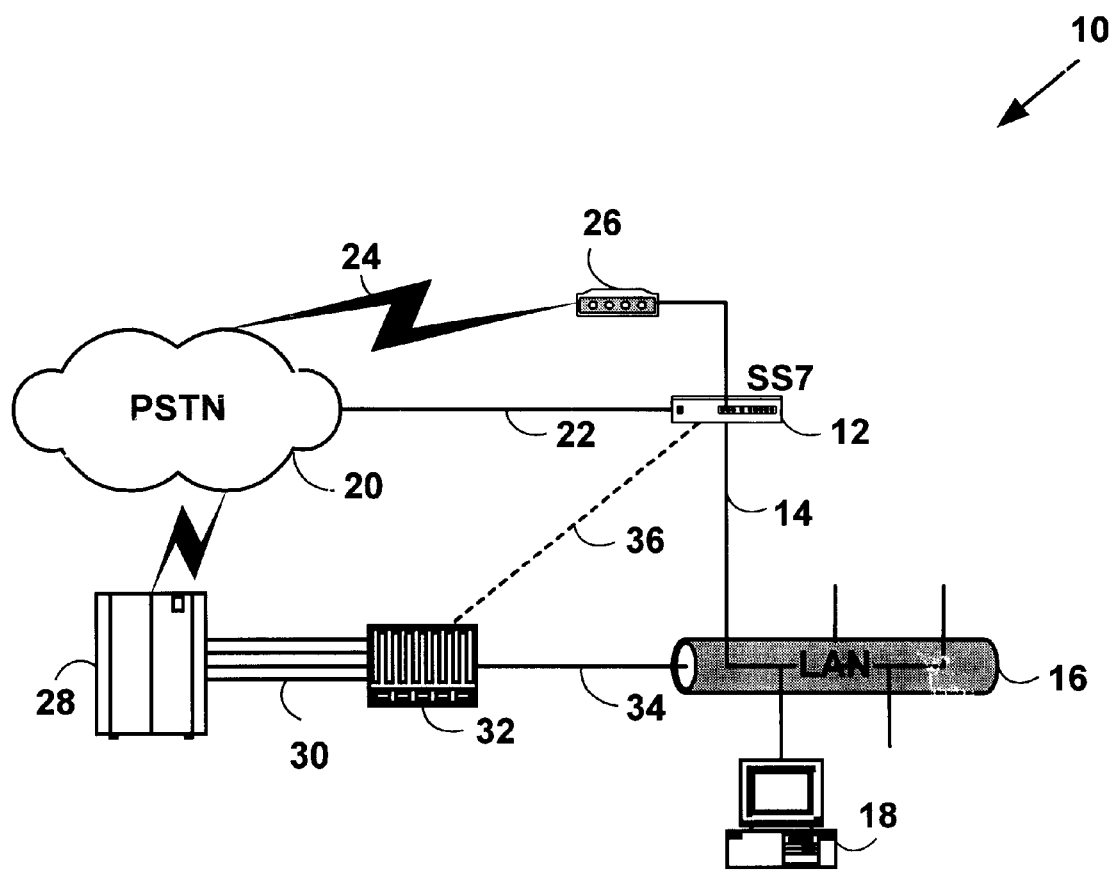
FIG. 1 is a block diagram illustrating an exemplary network system with common channel signaling.

FIG. 1 is a block diagram illustrating an exemplary network system 10 with common channel signaling. Network system 10 includes a first signaling device 12 connected with a signaling first connection 14 to a first network 16 with a first network device 18. The first signaling device 12 is connected to a second network 20 with a second signaling connection 22. The first signaling device 12 is also connected 24 to the second network 20 via a second network device 26.

The second network 20 is connected to a third network device 28. The third network device 28 is connected 30 to a fourth network device 32. The fourth network device 32 is also connected 34 to the first network 16. However, the present invention is not limited to the signaling devices, network devices, networks or connections illustrated in FIG. 1, and other signaling devices network devices, networks or connections may also be used.

An operating environment for network devices and signaling devices of the present invention include a processing system with at least one high speed Central Processing Unit ("CPU") and a memory. In accordance with the practices of persons skilled in the art of computer programming, the present invention is described below with reference to acts and symbolic representations of operations that are performed by the processing system, unless indicated otherwise. Such acts and operations are referred to as being "computer-executed" or "CPU executed".

It will be appreciated that acts and symbolically represented operations include the manipulation of electrical signals by the CPU. The electrical system represents data bits which cause a resulting transformation or reduction of the electrical signal representation, and the maintenance of data bits at memory locations in a memory system to thereby reconfigure or otherwise alter the CPU's operation, as well as other processing of signals. The memory locations where data bits are maintained are physical locations that have particular electrical, magnetic, optical, or organic properties corresponding to the data bits.

The data bits may also be maintained on a computer readable medium including magnetic disks, optical disks, organic disks and any other volatile (e.g., Random Access Memory ("RAM")) or non-volatile (e.g., Read-Only Memory ("ROM")) mass storage system readable by the CPU. The computer readable medium includes cooperating or interconnected computer readable medium, which exist exclusively on the processing system or be distributed among multiple interconnected processing systems that may be local or remote to the processing system.

Alternative Signaling Path

FIG. 2 is a flow diagram illustrating a Method 40 for providing an alternative signaling path. At Step 42, first signaling message in a first protocol is received on a first signaling device 12 on a first network 16 to create a connection between a first network device 18 on the first network 16 and the second network 20. At Step 44, the first signaling message is converted into a second signaling message in a second protocol on the first signaling device 12. At Step 46, the first signaling device 12 determines that a signaling first connection 14 between the first signaling device 12 and the first network 16 has failed.

At step 48, the second signaling message is sent from a second network device 26 associated with first signaling device 12 to a third network device 28 on the second network 20 over a second connection 24. At Step 50, the second signaling message is sent from the third network device 28 on the second network 20 to a fourth network device 32 on the first network 16 over a third connection 30. At Step 52, the second signaling message is sent from the fourth network device 32 to the first network device 18 on the first network 16 over a fourth connection 34, thereby providing an alternate signaling connection 36 to the first network device 18 on the first network 16 from the first signaling device 12.

In one preferred embodiment of the present invention, the alternate signaling connection 36 is a virtual connection between the first signaling device 12 and the fourth network device 32 via the second network. The alternate signaling connection 36 includes wireless connections, satellite connections or other telephony connections.

In one exemplary preferred embodiment of the present invention, Method 40 is used to provide an alternative (a common channel Signaling System number-7"SS7") signaling path. For more information on common channel Signaling System number-7 see "Specifications of Signaling System No. 7", CCITT Blue Book, VI.7–VI.9, recommendations Q.701–Q.795, International Telecommunications Union, 1989, incorporated herein by reference. At Step 42, a first SS7 signaling message is received on a SS7 gateway 12 on LAN 16 from a Public Switched Telephone Network ("PSTN") to create a connection between a first network device 18 on the LAN 16 and a telephony switch 28 on the PSTN 20. The PSTN is any of those provided by AT&T, Regional Bell Operating Companies (e.g., Ameritech, U.S. West, Bell Atlantic, Southern Bell Communications, Bell South, NYNEX, and Pacific Telesis Group), GTE, and others.

At Step 44, the SS7 signaling message is converted into a second signaling message in a second protocol on the SS7 gateway 12. In one exemplary preferred embodiment of the present invention, the second protocol is a Signaling LAN Application Protocol ("SLAP"). The SLAP protocol is used to transport SS7 and other protocols used on a Wide Area Network ("WAN") on a LAN. However, other protocols could also be used for the second protocol including Internet Protocol Device Control ("IPDC") by Level 3 Communications of Omaha, Nebr., and others.

At Step 46, the SS7 gateway 12 determines that a signaling connection (e.g., Transmission Control Protocol ("TCP") over Internet Protocol ("IP") connection) 14 between the SS7 gateway 12 and LAN 16 has failed. As is known in the art, TCP provides a connection-oriented, end-to-end reliable protocol designed to fit into a layered hierarchy of protocols which support multi-network applications. TCP provides for reliable inter-process communication between pairs of processes in network devices attached to distinct but interconnected networks. For more information on TCP see Internet Engineering Task Force ("IETF") Request For Comments ("RFC") RFC-793, incorporated herein by reference. As is known in the art, IP is an addressing protocol designed to route traffic within a network or between networks. IP is described in RFC-791, incorporated herein by reference.

At step 48, the second signaling message is sent from a telephone network device 26 (e.g., a modem) associated with SS7 gateway 12 to telephony switch 28 on the PSTN 20 over a second connection 24. The telephony switch is any of those provided by Siemens AG, of Munich Germany, Lucent Technologies, of Murray Hill, N.J., Nortel, of Brampton, Ontario, Canada and others.

At Step 50, the second signaling message is sent from the telephony switch 28 on the PSTN 20 to a remote access server 32 on the LAN 16 over a third connection 30. In one preferred embodiment of the present invention, the remote access server 32 is a Total Control Telephony Hub by 3Com Corporation of Santa Clara, Calif. A Total Control Telephony Hub is described in U.S. Pat. No. 5,528,595, granted to Dale M.Walsh et al., incorporated herein by reference. However, other remote access servers could also be used including those by Lucent Technologies (including those by the former Livingston Enterprises, Inc. of Pleasanton, Calif.), Ascend Communications of Alameda, Calif. and others.

At Step 52, the second signaling message is sent from remote access server 32 to the first network device 18 on the LAN 16 over a fourth connection 34. An alternate signaling connection 36 is thereby provided to the first network device 18 on the LAN 18 from the 557 gateway 12.

However, the present invention is not limited to the exemplary signaling devices, network devices, networks or connections described, and other signaling devices network devices, networks or connections may also be used.

Preferred embodiments of the present invention provide an alternative signaling path that does not rely on the same hardware or software that is used for a primary signaling path. The alternative signal paths allow network devices on a local area network to be signaled when a primary signaling path to the local area network has failed. The alternative signaling paths may provide better fault tolerance for connecting local area networks to other external networks.

It should be understood that the programs, processes, methods and system described herein are not related or limited to any particular type of computer or network system (hardware or software), unless indicated otherwise. Various types of general purpose or specialized computer systems may be used with or perform operations in accordance with the teachings described herein.

In view of the wide variety of embodiments to which the principles of the present invention can be applied, it should be understood that the illustrated embodiments are exemplary only, and should not be taken as limiting the scope of the present invention. For example, the Steps of the flow diagrams may be taken in sequences other than those described, and more or fewer elements may be used in the block diagrams.

The claims should not be read as limited to the described order or elements unless stated to that effect. Therefore, all embodiments that come within the scope and spirit of the following claims and equivalents thereto are claimed as the invention.

We claim:

1. A method for providing an alternate signaling connection, comprising the following steps:

receiving a first signaling message in a first protocol on a first signaling device on a first network from a second network to create a connection between a first network device on the first network and the second network;

converting the first signaling message into a second signaling message in a second protocol on the first signaling device;

determining from the first signaling device that a first signaling connection between the first signaling device and the first network has failed;

sending the second signaling message from a second network device associated with the first signaling device to a third network device on the second network over a second connection;

sending the second signaling message from the third network device on the second network to a fourth network device on the first network over a third connection;

sending the second signaling message from the fourth network device to the first network device on the first network over a fourth connection, thereby providing an alternate signaling connection to the first network device on the first network from the first signaling device.

2. A computer readable medium having stored therein instructions for causing a central processing unit to execute the method of claim 1.

3. The method of claim 1 wherein the first signaling message is a Common Channel Signaling System Number-7 message.

4. The method of claim 1 wherein the second signaling message is a Signaling LAN Application Protocol message.

5. The method of claim 1 wherein the first network is a local area network and the second network is a public switched telephone network.

6. The method of claim 1 wherein the first network device and second network device are modems, the third network device is a telephony switch, and the fourth network device is a network access server.

7. The method of claim 1 wherein the first connection is Transmission Control Protocol over Internet Protocol connection, the second connection and the third connection are telecommunications connections and the fourth connection is a data packet connection.

8. The method of claim 7 wherein the data packet connection is an internal data packet bus connection.

9. The method of claim 1 wherein the second protocol is an Internet Protocol Device Control protocol.

10. A method for providing an alternate signaling connection, comprising the following steps:

receiving a first signaling message in a first protocol on a first signaling device on a first network from a second network to create a connection between a first network device on the first network and the second network;

converting the first signaling message into a second signaling message in a second protocol on the first signaling device;

determining from the first signaling device that a first signaling connection between the first signaling device and the first network has failed;

sending the second signaling message to the first network device on the first network via a second virtual signaling connection through the second network.

11. A computer readable medium having stored therein instructions for causing a central processing unit to execute the method of claim 10.

12. The method of claim 10 wherein the first protocol is a Common Channel Signaling System Number-7 protocol.

13. The method of claim 10 wherein the second protocol is a Signaling LAN Application Protocol.

14. The method of claim 10 wherein the second protocol is an Internet Protocol Device Control protocol.

15. The method of claim 10 wherein the first network is a local area network and the second network is a public switch telephone network.

16. The method of claim 10 wherein the second virtual signaling connection is a virtual signaling connection through a public switched telephone network.

17. A method for providing an alternate signaling connection, comprising the following steps:

receiving a first common channel signaling system number-7 message on a common channel signaling system number-7 gateway on a local area network from a public switched telephone network to create a connection between a first network device on the local area network and the public switched telephone network;

determining from the channel signaling system number-7 gateway that a first common channel signaling system number-7 connection between the first common channel signaling system number-7 gateway and the local area network has failed;

converting the first common channel signaling system number-7 signaling message into a second signaling message in a second protocol on the first common channel signaling system number-7 gateway;

sending the second signaling message from a modem associated with first signaling device to a telephony switch on the public switched telephone network over a second connection;

sending the second signaling message from the telephony switch on the public switched telephone network to a remote access server on the local area network over a third connection;

sending the second signaling message from the remote access server to the first network device on the local area network over a fourth connection, thereby providing an alternate common channel signaling system number-7 signaling connection to the first network device on the local area network from the common channel signaling system number-7 gateway.

18. A computer readable medium having stored therein instructions for causing a central processing unit to execute the method of claim 17.

19. The method of claim 17 wherein the second signaling protocol is a Signaling LAN Application Protocol.

20. The method of claim 17 wherein the second signaling protocol is an Internet Protocol Device Control protocol.

* * * * *